(12) United States Patent
Clements

(10) Patent No.: US 9,920,923 B2
(45) Date of Patent: Mar. 20, 2018

(54) HIGH PRESSURE DIRECT CONTACT OXY-FIRED STEAM GENERATOR

(71) Applicant: Her Majesty The Queen in Right of Canada as Represented by the Minister of Natural Resources, Ottawa (CA)

(72) Inventor: Bruce Clements, Nepean (CA)

(73) Assignee: HER MAJESTY THE QUEEN IN RIGHT OF CANADA AS REPRESENTED BY THE MINISTER OF NATURAL RESOURCES, Ottawa (CA)

(*) Notice: Subject to any disclaimer, the term of this patent is extended or adjusted under 35 U.S.C. 154(b) by 13 days.

(21) Appl. No.: 15/343,685

(22) Filed: Nov. 4, 2016

(65) Prior Publication Data

US 2017/0108208 A1   Apr. 20, 2017

Related U.S. Application Data (62) Division of application No. 13/133,209, filed as application No. PCT/CA2009/001805 on Dec. 10, 2009, now Pat. No. 9,512,999.

(30) Foreign Application Priority Data

Dec. 10, 2008   (CA) ..................................... 2646171

(51) Int. Cl.
- *F22B 1/18* (2006.01)
- *F23L 7/00* (2006.01)
- *F22B 37/48* (2006.01)

(52) U.S. Cl.
CPC ............ *F22B 1/1853* (2013.01); *F22B 37/48* (2013.01); *F23L 7/007* (2013.01)

(58) Field of Classification Search
CPC .......... F22B 1/1853; F22B 37/48; F23L 7/007
See application file for complete search history.

(56) References Cited

U.S. PATENT DOCUMENTS 2,734,578 A * 2/1956 Walter ................. E21B 36/025
                                                       166/272.1
3,247,890 A    4/1966 Williams
(Continued)

FOREIGN PATENT DOCUMENTS

CA    2584627 A1   10/2004
CA    2632170 A1   11/2008
(Continued)

*Primary Examiner* — Nathaniel Herzfeld (57) ABSTRACT

A method and apparatus for direct contact steam generation for a variety of industrial processes including heavy oil recovery, power generation and pulp and paper applications. The steam generation system consists of a combustor and steam generator and is constructed to be operable at elevated pressures. The fuel, at least one oxidant and a fluid supply including water are supplied at pressure to the combustor. Flue gas from the combustor is delivered to the direct contact steam generator at pressure, and upon direct contact with water produces a flue gas stream consisting primarily of steam. This product stream can then be cleansed and used for industrial application. The combustor can be operated with low grade fuel and low quality water with high solids and hydrocarbon contents. The apparatus and method reduce the environmental footprint by reducing air emission, concentrating $CO_2$ to enable capture and reducing clean water requirements.

21 Claims, 3 Drawing Sheets

(56) References Cited

U.S. PATENT DOCUMENTS

| | | | |
|---|---|---|---|
| 3,922,974 A | 12/1975 | Hempelmann | |
| 3,996,862 A | 12/1976 | Besik et al. | |
| 4,118,925 A | 10/1978 | Sperry et al. | |
| 4,156,421 A | 5/1979 | Cradeur et al. | |
| 4,199,024 A * | 4/1980 | Rose | E21B 36/02 |
| | | | 166/53 |
| 4,398,604 A | 8/1983 | Krajicek et al. | |
| 4,499,946 A * | 2/1985 | Martin | B01J 19/14 |
| | | | 166/267 |
| 4,545,330 A * | 10/1985 | Covell | F22B 1/1846 |
| | | | 122/392 |
| 4,546,829 A * | 10/1985 | Martin | B01J 19/14 |
| | | | 166/267 |
| 4,565,249 A | 1/1986 | Pebdani et al. | |
| 4,580,504 A | 4/1986 | Beardmore et al. | |
| 4,665,705 A | 5/1987 | Bonham, Jr. | |
| 4,878,440 A | 11/1989 | Tratz et al. | |
| 5,240,592 A | 8/1993 | Meyer et al. | |
| 5,251,433 A | 10/1993 | Wallace | |
| 5,607,577 A | 3/1997 | Koszarycz et al. | |
| 6,089,024 A | 7/2000 | Hatanaka | |
| 6,279,495 B1 | 8/2001 | Karidio et al. | |
| 6,468,345 B1 | 10/2002 | Zhu et al. | |
| 6,637,206 B2 | 10/2003 | Thiessen | |
| 6,988,549 B1 | 1/2006 | Babcock | |
| 7,090,014 B2 | 8/2006 | Good et al. | |
| 7,320,288 B2 | 1/2008 | Marin et al. | |
| 7,591,309 B2 | 9/2009 | Minnich et al. | |
| 2002/0095866 A1 | 7/2002 | Hassett | |
| 2005/0082067 A1 | 4/2005 | Good et al. | |
| 2006/0065213 A1 * | 3/2006 | Sarkar | F22B 31/00 |
| | | | 122/406.1 |
| 2006/0243448 A1 | 11/2006 | Kresnyak et al. | |
| 2007/0266962 A1 | 11/2007 | Stone et al. | |
| 2008/0000644 A1 | 1/2008 | Tsilevich | |
| 2008/0110630 A1 | 5/2008 | Minnich et al. | |
| 2008/0289821 A1 * | 11/2008 | Betzer Tsilevich | E21B 43/2406 |
| | | | 166/272.3 |
| 2008/0289822 A1 * | 11/2008 | Betzer Tsilevich | E21B 43/24 |
| | | | 166/272.3 |
| 2009/0120338 A1 * | 5/2009 | Adendorff | C03B 5/235 |
| | | | 110/345 |
| 2010/0050517 A1 * | 3/2010 | Tsilevich | F22B 1/1853 |
| | | | 48/127.1 |

FOREIGN PATENT DOCUMENTS

| | | |
|---|---|---|
| CA | 2674660 A1 | 11/2009 |
| CN | 2906705 | 5/2007 |
| WO | 2007081816 A2 | 7/2007 |
| WO | 2008090167 A1 | 7/2008 |
| WO | 2008095984 A2 | 8/2008 |
| WO | 2008097295 A2 | 8/2008 |
| WO | 2008097666 A1 | 8/2008 |
| WO | 2009076763 A1 | 6/2009 |

* cited by examiner

HIGH PRESSURE DIRECT CONTACT OXY-FIRED STEAM GENERATOR

CROSS-REFERENCE TO RELATED APPLICATIONS

This application is a Divisional of U.S. patent application Ser. No. 13/133,209 filed Jun. 7, 2011, which is a U.S. National Stage of International Application No. PCT/CA2009/001805 filed Dec. 10, 2009 which claims priority to Canadian Patent Application No. 2646171, filed Dec. 10, 2008. The contents of each of which are incorporated by reference in their entirety.

FIELD OF THE INVENTION

The invention relates to direct contact steam generation, that is the generation of steam by direct contact with flue gas, for industrial use, and in particular to an apparatus and method for generation of steam in a high pressure oxygen-fired process, in which the combustion fuels can be solid, liquid, and gaseous fuels, and the water used can be partly treated or untreated.

BACKGROUND OF THE INVENTION

Many industrial processes require large quantities of steam, which is not necessarily required to have a high purity. Nevertheless, in all such processes, environmental issues generally arise in relation to pollutants released in the process itself or in the production of the steam generated. Of particular concern is the release of criteria air contaminants such as nitrogen oxides, sulphur oxides and mercury species as well as carbon dioxide, and the resultant greenhouse gas effect.

Such industrial processes include, but are not limited to, power generation applications such as Rankine cycles, Brayton cycles, combined cycles, gasification processes and cogeneration; and to various general steam applications in the fields of manufacturing or processing of pulp and paper, fertilizers, chemicals and petrochemicals, ethylene, textiles, oil extraction, mining, separation of organic compounds, desalination, provision of district heating, and process use in gas plants and refineries.

For such processes, the production of the necessary quantities of steam may result in the depletion or serious reduction of locally available water supplies, such as rivers or lakes. Furthermore, even if the end use does not require high purity of the steam, the equipment conventionally used for the generation of the steam requires that the input water have a high purity, in particular being substantially free of hydrocarbons and solids, generally resulting in the need for on site water treatment systems.

Conventionally, for many of these processes, boilers provide indirect heat to produce the required steam from treated boiler water. The thermal efficiency of these devices tends to be around 80%; the approximately 20% loss consists of sensible heat and latent heat associated with the dry flue gases and uncondensed moisture exiting through the stack, respectively.

Different equipment is used depending upon the purity of the feedwater and the required steam, and the amount of makeup water required for the process. These include single drum boilers, double drum boilers, once-through steam generators, and direct contact steam generators. Single drum boilers are typical of many utility boilers that use closed cycle steam systems. Fresh water can be relatively easily treated because only a small amount of makeup water must be added to the cycle. Double drum boilers are commonly used for industrial applications because they can more easily separate solids that accumulate as large quantities of process steam are generated using an open cycle. Open cycle operation necessitates very large amounts of expensive feedwater treatment, requiring chemicals and energy. In a double drum arrangement, the lower drum concentrates the solids that can be removed by means of a blowdown extraction. This blowdown results in heat loss from the system, and wastewater release which may require subsequent treatment before release into the environment.

Boilers used in the tar sands currently are an adaptation of the industrial boiler that allows for increasingly poorer feedwater. These once-through steam generators (OTSGs) generally produce 80% quality steam, meaning that there is 20% saturated water included in the product. Since all the product is not steam, the water concentrates the solids formed allowing them to be flushed through the system. In many locations, such as at oil extraction sites or mines, local clean water supplies are being depleted, while new contaminated water sources are created by the wastewater.

A further adaptation to this technology is the use of air-fired direct-contact steam generators. As compared with conventional indirect steam generation, direct contact generators have the advantages of being smaller and more transportable, of having high energy efficiency, the ability to use somewhat lower quality water, and of requiring significantly less capital expense. However, known methods of direct steam generation using air-firing, when compared with conventional steam generation, have the disadvantages that they provide only low quality steam due to dilution by the presence of nitrogen. The nitrogen fraction is generally non-condensable, and the production of carbonic acid from the water and carbon dioxide tends to create the risk of corrosion problems. Additionally, steam generators create air pollution problems, in the form of criteria air contaminants such as nitrogen oxides, sulphur oxides, mercury species, and greenhouse gas emissions which, as noted above, are of steadily increasing concern.

The problems of producing large quantities of steam without environmental damage are particularly significant in the field of oil exploration, separation and extraction processes, which are generally in remote locations. In particular, in oil sands areas such as northern Alberta, Canada, current practices include various processes which require large steam consumption. These processes include, but are not limited to separation of mined tar sand, cyclic steam stimulation (CSS), and steam assisted gravity drainage (SAGD).

For these processes, access to an adequate clean water supply may be difficult, and may create the problem of excessive withdrawal from local sources, resulting in deficiencies of available supply for other uses. Many of these processes result in large quantities of hydrocarbon-contaminated wastewater being deposited above ground, leading to environmental damage which can be severe. Further, the steam generation processes currently in use have associated problems from the release of carbon dioxide.

The above concerns emphasize the need for methods of steam generation for the various processes and uses noted above, and others, without the environmentally damaging discharge of contaminated water, carbon dioxide or other pollutants, and at the same time without excessive depletion of clean water supplies.

In relation to oil field applications, particularly for the production of steam for use specifically in SAGD operations, there are recent publications suggesting that it might be possible to use water which contains contaminants, to avoid unnecessary depletion of clean water supplies or alternatively the need for expensive water treatment facilities.

For example, WO 2009/076763 proposes a "system for low emission hydrocarbon recovery", in which a compound heat medium for a SAGD process would be generated by combusting a fuel in the presence of an oxidant and a moderator, at elevated temperature and pressure, to create products of combustion, which would be brought into contact with a steam generating medium. The compound heat medium including steam is delivered at pressure with the steam into the intended oil recovery location for use in the recovery process. The publication suggests that some of the carbon dioxide produced will pass into the geological strata or can be recovered separately. The publication suggests that the oxidant can include at least 50% oxygen, but does not address the problems associated with nitrogen which result from the use of air in the process, and overlooks various other problems which would arise from the proposed process.

In particular, the use of 50% oxygen would produce lower quality steam due to the presence of high levels of non-condensable nitrogen. Further, the presence of nitrogen introduces more non-condensable impurities into the produced stream, which would thus significantly decrease the potential to economically create a pure CO2 stream for sequestration purposes.

Still further, the nitrogen presence at high temperatures will increase the thermal NOx formation requiring additional flue gas treatment to minimize this pollutant.

The publication also suggests that low quality water can be used as the steam generating medium, and that accumulated medium can be used as the moderator in the first combustion stage. However, the publication entirely fails to teach a structure which could successfully operate. The suggested structure and arrangement suffers from several serious disadvantages.

In a structure of this nature, ash including liquid slag will be formed in the combustion zone and will run until reaching an environment where lower temperature will create solidification. As the publication only requires that the suggested structure provide combustion temperatures which are sufficient to melt the expected solid contaminants, there is serious risk of solidification in the vessel, and potential blockage downstream of the combustion zone. These blockages will likely occur at the interface between the combustor and the evaporator (steam generation zone) as well as between the evaporator and the slag collection and sump sections (zone) of the system presented due to constrictions in the flow path. In addition, contaminants which may pass from the first combustion stage to the evaporator or slag collection and sump stages can be expected to result in further plugging problems at that stage.

The publication suggests that water collected in the bottom of the vessel can be recirculated into the combustion zone. However, such water would clearly not be suitable for recirculation back into the combustion zone due to the high solid content. The sump and recirculation scheme proposed will concentrate the solids within the moderator (water) stream as shown. If such high concentration solids are re-introduced into the high temperature environment of the combustor, they will inevitably add to potential plugging problems.

The publication suggests that low quality fuels can be used, in order to avoid the high cost of using natural gas or other high quality fuel to generate steam, and identifies the problems of NOx and sulphur compounds which will result from such low quality fuels. If alkali sorbent is used for control of $SO_2$, $NO_x$ and other acid products these reactions tend to occur optimally at low temperatures. However, these alkali materials tend to have fouling problems associated with their use. In particular, because of the solid nature of the materials, returning them to the hotter combustor zone will add still further to the slagging and plugging problems identified above.

It is noteworthy that this publication, unlike application U.S. 61/017,828 from which it claims priority, for the first time claims a system operating at "elevated temperature and pressure". In the priority application, there is no consideration of the role of temperature and pressure in the combustion stage, and no identification of any structure based on these parameters. In the publication WO 2009/076763, the only consideration of them appears to be restricted to the perceived need for higher temperature to melt any solids in the proposed low quality fuels, in that the role of pressure and the selection of appropriate values is not identified.

Thus, although the publication suggests the desirable goal of a system in which lower quality fuels and lower quality water might be used for generation of steam for use in a SAGD process, it does not teach any structure which would in fact be capable of meeting that goal and performing reliably in a continuous operation in the intended environment.

As a further example, CA 2,632,170 proposes an integrated system and method for SAGD heavy oil production using low quality fuel and low quality water. The system includes a two stage process, of combusting the fuel at temperatures and pressures within a selected range, to produce a gaseous flow to a steam generation unit. The fuel is combusted with oxidation gases which can be oxygen, oxygen-enriched air or air; and the combustion gases together with all solids pass through a heat exchanger unit before any solids removal. Any liquids or solids which accumulate in the steam generator are also passed back into the combustor. Thus, an accumulation of unwanted solids can be expected to clog the system, at various locations, in particular at the heat exchanger, and lead to system failure. In particular, it can be expected that the use of low quality fuel and low quality water in the combustor will require careful measures to avoid clogging the system, particularly at regions of constriction, so the addition of still further solids to the first (combustion) stage from the later stages can only be expected to create substantial additional problems.

Similarly to WO 2009/076763 noted above, publication CA 2,632,170 suggests high temperatures and pressures for the combustor stage, but fails to identify a structure in which the proposed parameters can be attained, nor any method of starting up a system which could proceed to operate within the suggested ranges and thereafter continue in effective operation without failure. The use of air in the combustor leads to the problems, identified above in relation to WO 2009/076763.

The publication CA 2,632,170 suggests the use of oxygen, which would, if effective, address some of the problems associated with the nitrogen content of air, but does not teach any actual structure, much less one which is capable of operation within the parameters involved, including the higher temperatures of oxygen firing, and the controls required for safe and effective operation.

The publication fails to show an effective means of solid slag removal from the combustor. In the schematic presented in the publication, all the flows from the combustor are shown as entering a heat exchanger prior to any solids removal. This proposal fails to take into account the serious risk of immediate clogging, if the proposed low quality fuels are used.

Further, the publication suggests that water collected in the bottom of the steam generator be recirculated into the combustion zone. Even if some solids could be removed prior to recirculation, the water would nevertheless have an elevated solid content, rendering it clearly unsuitable for recirculation back into the combustion zone. Any addition of alkali into this stream to address $SO_2$, $NO_x$ and other acid products will worsen the situation still further.

Still further, although the publication indicates that low quality water can be used, there is the concurrent requirement for a steady supply of fresh water at the steam generator, at least some of which would appear to be required to be clean water.

Thus the two publications noted above suggest the advantages of systems which could use low quality fuel and low quality water. Although such systems are highly desirable, neither of these publications addresses the problems involved, in that neither teaches any structural system which would or could overcome the problems arising from the varied and wide range of contaminants involved in the low quality input, either for oil recovery operations such as SAGD, to which the publications are directed, much less for any of the broader range of operations to which the present invention is directed.

It has now been found that the use of oxygen-firing, commonly know as oxy-firing, with the associated removal of the problem of the nitrogen dilution of air, in a process for direct steam generation, where combined with suitable steps to deal with contaminants, can allow for the generation of steam for the broad range of operations identified above, including but clearly not limited to oil recovery, with safe and effective separation of carbon dioxide for sequestration or other controlled use or disposal. As discussed further below, it has been found that an apparatus can be provided for such process, in which low quality fuel and water can be used.

The method and apparatus of the invention address and resolve the problems noted above, which remain real and substantial in relation to systems of this nature, and not addressed in practice by the systems proposed in the recent publications directed to steam generation for a SAGD process.

In particular, the apparatus provides for effective removal of contaminants at the earliest feasible stage within the location of the apparatus in which they enter the system, rather than being carried into subsequent locations, with the consequent problems of accumulation and clogging. The apparatus further addresses the problems of ensuring safe start-up and operation, with effective means of ongoing monitoring and cleaning to remove any solids. The controlled temperatures of the combustor, assisted by controlled selective recirculation from the steam generator, maximize the quality of the flue gas passing into the steam generator, and hence minimize the contaminant removal burden within the steam generator, so that any particulate scrubbing means is not overloaded.

The present invention therefore provides a method and apparatus for direct contact steam generation in which the air-firing is replaced by oxygen-firing, and solid combustion fuels can be used. Furthermore, this method and apparatus allows for the substantial reduction of clean water requirements through the use of hydrocarbon-contaminated water in the combustor. This maintains the same advantages which result from air-fired direct contact steam generation, but at the same time eliminates the disadvantages resulting from the nitrogen content of air, that is, low quality steam and non-condensable nitrogen.

The use of oxy-firing in a process for direct steam generation has additional advantages over those of direct air-fired steam generation, including the ability to use wastewater while producing high quality steam, the ability to sequester carbon dioxide, and reduction of equipment size making it more transportable and lower in capital cost. However, to provide the oxygen for the process, there is the additional requirement of the oxygen supply, either by means of an on-site air separation unit, or supply from a remote location in containers such as cylinders.

Oxy-firing of hydrocarbon fuels results in excessive flame temperatures of at least 2830° C. compared with air-firing situations where the flame is typically about 1960° C. The higher temperature from the oxy-firing allows for the use of a broader range of fuels, including solid fuels such as bitumen, asphaltene, coal, and petroleum coke. If conventional combustion equipment is used for oxy-firing, there will generally be a need to quench the flame temperatures to the level of air fired sources; this is typically done by recirculating flue gas. However, in direct fired applications, water can be used to efficiently quench flame temperatures.

In the direct fired steam generation method of the invention, the oxy-fired flame is preferably supplied to the combustor at high pressure. Either pressurized water or recirculated flue gas, or both, is used as necessary to quench the flame temperatures to manageable temperature levels. Water which can be taken from any readily available source, and can be contaminated with dissolved, suspended or entrained solids and hydrocarbons, is sprayed into the system closely downstream of the burner. The flue gas is then transferred to the steam generator where contact with a flow of input water creates the final steam product, and removes solids and pollutants. The features of the method and apparatus allow for the use of input water to the steam generator which is also not clean. In the steam generator, solids can be removed by conventional scrubbing means.

The product steam will consist mostly of carbon dioxide and water vapour. Where the end use for the steam is in a SAGD or CSS process, the complete flow will be pumped underground resulting in sequestration of the carbon dioxide portion. Other processes may require a separation of the carbon dioxide by either pressure let down or some other means. Due to the fact that the combustion products are all converted to the usable product stream the thermal efficiency of the apparatus of the invention is close to 100%.

SUMMARY OF THE INVENTION

The invention therefore seeks to provide an apparatus for direct contact steam generation comprising a combustor and a steam generator operatively connected to the combustor, (a) the combustor being constructed and arranged to be selectively operable at a pressure exceeding atmospheric pressure, and having a first combustor end and a second combustor end, and comprising (i) a combustor wall comprising an outer wall and a refractory liner having an inner surface defining a combustion space;

(ii) a burner proximate the first combustor end;
(iii) at least a first fuel inlet proximate the first combustor end and constructed and arranged to deliver a first fuel to the burner at a delivery pressure exceeding atmospheric pressure;
(iv) at least one oxidant inlet proximate the first combustor end and constructed and arranged to deliver a supply of oxygen to the burner at a delivery pressure exceeding atmospheric pressure;
(v) a plurality of fluid inlets operatively connected to the combustion space and constructed and arranged to deliver a supply of a fluid including water at a delivery pressure exceeding atmospheric pressure; and
(vi) an outlet region proximate the second combustor end and having a flue gas outlet and a combustor residue outlet;
(b) the steam generator having
(i) a housing body having a first generator end, a second generator end and an intermediate region;
(ii) a steam generation fluid inlet proximate the first generator end and constructed and arranged to receive a supply of steam generation fluid including water at a supply pressure greater than the selected combustor operating pressure;
(iii) a flue gas inlet proximate the second generator end and operatively connected to the flue gas outlet of the combustor;
(iv) a steam outlet located in the intermediate region between the flue gas inlet and the first generator end and operatively connected to a steam output delivery means; and
(v) a residue receiving region proximate the second generator end and having at least one steam generator residue outlet.

The invention also seeks to provide an apparatus for direct contact steam generation comprising a combustor constructed and arranged to be operatively connected to a steam generator, wherein the combustor is constructed and arranged to be selectively operable at a pressure exceeding atmospheric pressure, and comprises
(i) a first combustor end and a second combustor end;
(ii) a combustor wall comprising an outer wall and a refractory liner having an inner surface defining a combustion space;
(iii) a burner proximate the first combustor end;
(iv) at least a first fuel inlet proximate the first combustor end and constructed and arranged to deliver a first fuel to the burner at a delivery pressure exceeding atmospheric pressure;
(v) at least one oxidant inlet proximate the first combustor end and constructed and arranged to deliver a supply of oxygen to the burner at a delivery pressure exceeding atmospheric pressure;
(vi) a plurality of fluid inlets operatively connected to the combustion space and constructed and arranged to deliver a supply of a fluid including water at a delivery pressure exceeding atmospheric pressure; and
(vii) an outlet region proximate the second combustor end and having a flue gas outlet and a combustor residue outlet;
wherein the flue gas outlet is constructed and arranged to deliver a stream of flue gas to the steam generator for direct contact with a steam generation fluid including water to generate a steam product.

The invention further seeks to provide a method of direct contact steam generation comprising the steps of
(a) providing
(i) a combustor having a burner and a refractory wall defining a combustion space and operable at a combustor operating pressure exceeding atmospheric pressure; and
(ii) a steam generator operatively connected to the combustor and having an upper region, a lower region and an intermediate region;
(b) performing a pre-heating process at ambient pressure to raise the temperature of the refractory wall to a selected temperature;
(c) delivering a fuel and a supply of oxygen to the burner at a pressure exceeding a selected combustor operating pressure;
(d) burning the fuel and oxygen at the selected combustor operating pressure and substantially concurrently delivering to the combustion space a supply of a fluid including water at a pressure exceeding the selected combustor operating pressure to produce a stream of flue gas and a combustion residue;
(e) delivering the stream of flue gas to the lower region of the steam generator and substantially concurrently delivering to the upper region a supply of steam generation fluid including water at a pressure exceeding the selected combustor operating pressure;
(f) allowing the flue gas to contact the steam generation fluid to produce a stream of generated steam; and
(g) removing the stream of generated steam from the steam generator.

As discussed above, the supply of fluid to the combustor can include at least one hydrocarbon material.

Preferably, the refractory liner comprises a set of cooling tubes, and at least one cooling fluid inlet operatively connected to the set of cooling tubes and at least one cooling fluid outlet operatively connected to the set of cooling tubes.

Optionally, the apparatus further comprises an air separation unit constructed and arranged to be operatively coupled to the at least one oxidant inlet.

Preferably, the combustor further comprises at least one wash fluid inlet constructed and arranged to selectively deliver wash fluid into the combustor, and more preferably comprises at least two wash fluid inlets, constructed and arranged to deliver the wash fluid to contact different surfaces within the combustor including the inner surface of the refractory liner and an inner surface of a region proximate the second combustor end. Preferably, the outlet region of the combustor also comprises a combustor residue grinder.

Preferably, the combustor further comprises a water inlet proximate the first combustor end and constructed and arranged to deliver water to the burner at a delivery pressure exceeding atmospheric pressure.

Preferably, the intermediate region of the steam generator comprises a cleaning zone located between the steam outlet and the second generator end, and comprising at least one of a packed bed, a venturi scrubber, a spray chamber and at least one water reservoir.

Preferably, the steam generator fluid inlet comprises at least one nozzle, each nozzle having a plurality of jets, and more preferably the steam generation fluid comprises water including contaminants.

Preferably, the steam generator further comprises a demister located proximate the steam outlet.

Preferably, the steam output delivery means comprises at least one steam quality adjustment means; preferably this comprises a secondary liquid delivery inlet constructed and arranged to deliver a supply of a secondary liquid including water to the steam output delivery means.

Preferably, the combustor further comprises a steam inlet proximate the first combustor end, and the steam delivery means from the steam generator comprises a recirculation means constructed and arranged to selectively deliver part of the steam output to the steam inlet.

Preferably, the combustor further comprises at least a second fuel inlet proximate the first combustor end. Preferably, the fuel delivered to each fuel inlet is selected from the group consisting of a liquid fuel, a gaseous fuel and a solid fuel and mixtures thereof. Where solid fuel is used, this is preferably a slurry including at least one of bitumen, asphaltene, coal, and petroleum coke, in a suitable liquid, and can comprise an emulsifier.

Preferably, the combustor has an operable pressure range of between 3 bar and 175 bar, and each fuel inlet, each oxidant inlet and each fluid inlet and each steam generation fluid inlet is constructed and arranged to provide a delivery pressure exceeding each corresponding selected operating pressure of the combustor.

In the method of the invention, the preferable features include operating an apparatus having the features noted above, and the following additional features.

Optionally after step (b), the method can include the step of (b.1) providing a supply of nitrogen to the combustor to attain the selected combustor operating pressure, and the burning in step (d) maintains the selected combustor operating pressure. Alternatively, the burning in step (d) is performed to attain and maintain the selected combustor operating pressure.

Preferably, the supply of oxygen has a purity between 90% and 100%, and more preferably a purity between 95% and 100%.

Optionally, the steam generation fluid delivered in step (e) further comprises a sorbent comprising an alkali element selected from calcium, magnesium, sodium and potassium; preferably, such alkali element is in a compound form selected from a hydroxide and a carbonate.

Preferably, after step (f) the method further comprises passing the generated steam through a demisting region.

Preferably, in step (e) the steam generation fluid comprises water including contaminants.

Preferably, step (g) further comprises at least one adjusting of quality of the stream of generated steam; which preferably includes providing a supply of a secondary liquid including water to the steam output.

Preferably, step (g) comprises separating the steam output into a primary output and a secondary output, and recirculating at least part of the secondary output to the combustor.

Preferably, the method further comprises the steps of (h.1) selectively periodically removing residue from the combustor; and
(h.2) selectively periodically removing residue from the steam generator.

Preferably, steps (d) and (e) further comprise concurrently substantially continuously removing residue from the combustor; and steps (f) and (g) further comprise concurrently substantially continuously removing residue from the steam generator.

The apparatus and the method of the invention provide numerous advantages over prior art apparatus and methods, including but not restricted to the following:
control the peak flame temperature within the combustor zone
control the exit temperature out of the combustor zone
use solid fuels
use both liquid and gaseous fuels
high ash solid fuels
can use wastewater with large amounts of dissolved, suspended or entrained solids
can use wastewater with hydrocarbon and dissolved, suspended or entrained solids
reduced use of local clean water
reduction or reversal of environmental damage where wastewater is used
manage deposit buildups
deliver relatively high concentration steam with minimal nitrogen dilution
deliver steam of approximately 80% quality, or higher if required
deliver steam at a range of high pressures
small enough to be installed at a well head or other similar locations
transportable
able to remove large fractions of acidic species formed from combustion
continuous or periodic removal of solids from the system to attain continuous operation
removal and concentration of solids into a manageable dense slurry stream
small size makes it relatively economic to operate
will produce a stream of mostly water vapour and carbon dioxide that can be used in a process
the nature of the product stream allows for easy sequestration of the carbon dioxide.

BRIEF DESCRIPTION OF THE DRAWINGS

The invention will now be described with reference to the drawings, in which.

DETAILED DESCRIPTION OF THE DRAWINGS

Figure 1:
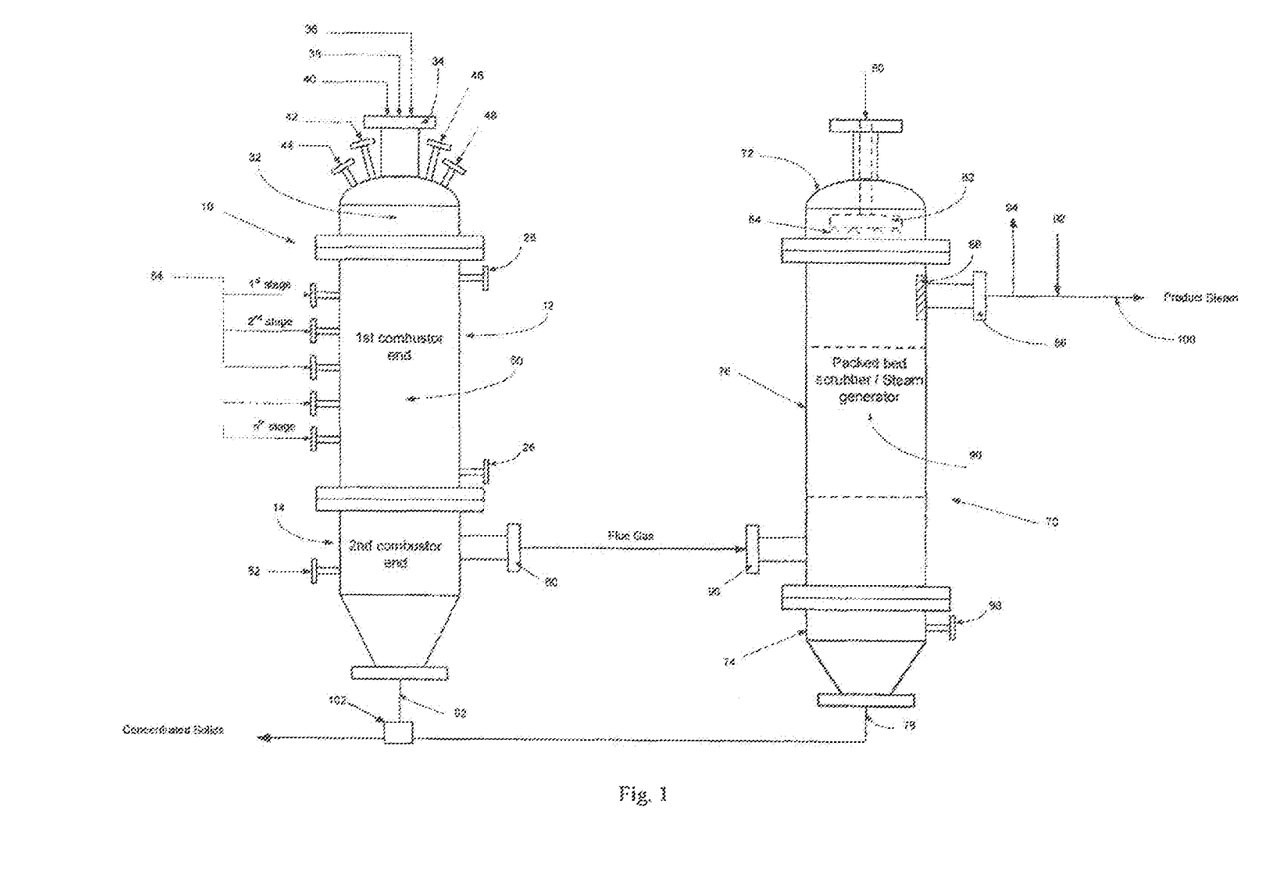
FIG. 1 is a schematic representation of an embodiment of the invention.

Referring first to FIG. 1, an embodiment of the apparatus 1 of the invention is shown, including a combustor 10 and a steam generator 70. The combustor 10 comprises a first end shown generally at 12, a second end shown generally at 14, and an outer wall 16. Within the outer wall 16, a refractory liner 18 (shown in detail in FIGS. 2 and 3) defines the combustor chamber 50. In the embodiment shown, the combustor 10 has a substantially vertical operational position, such that the first end 12 will be at the upper end and the second end 14 will be at the lower end, but other orientations are possible.

Near the first end 12 of the combustor 10, and directly operatively connected to the combustor chamber 50, is the burner region 32, within which is a burner (not shown). Various inlets are provided at the inlet end 34 of the combustor 10 to the burner region 32, including at least one fuel inlet 36, oxygen inlet 38, and water inlet 40, each of which is designed to deliver its respective input supply at a pressure sufficiently in excess of the contemporaneous pressure of the combustor 10 and burner, such that the input supply will flow into the burner at the desired rate. The other inlets shown in FIG. 1 are a pre-heat fuel inlet 42, an igniter 44, recirculated steam inlet 46, and upper ash purge water inlet 48; additional known inlets and features can be provided as required.

Downstream from inlet end 34 of the combustor 10, at least one inlet 54 is provided to deliver to the combustor chamber 50 a fluid supply which includes water, and may include dissolved, suspended or entrained solids, which can include hydrocarbons. Further inlet 26 and outlet 28 provide for additional flows of water or other thermal fluid to regulate the operating temperature of the combustor 10 to the desired range; and lower ash purge water inlet 52 is provided for purging the lower region at the second combustor end 14.

At the downstream end of the combustor chamber 50, flue gas outlet 60 delivers the flue gas supply from the combustor 10 to flue gas inlet 96 of the steam generator 70.

At or near the second end 14 of the combustor 10, a lower outlet 62 is provided, for the selected discharge of residue, including solids such as ash, and together with any purge fluid delivered to the chamber through either of the ash purge water inlets 48 or 52.

Steam generator 70, also shown in this embodiment as having a substantially vertical position, has a first (upper) end 72, a second (lower) end 74, and an intermediate region 76. At the first end 72, fluid inlet 80 is provided to deliver a supply of water to at least one nozzle 82, each nozzle having a plurality of jets 84.

Above the second end 74, flue gas inlet 96 is operatively connected to flue gas outlet 60 on combustor 10, to receive the flue gas supply into steam generator 70, the flue gas thereafter moving upwards to come into contact with the supply of water through the jets 84, as discussed further below. At or near the second end 74, recirculated water outlet 98 provides for the removal of any accumulated water, and blowdown 78 provides for selective removal of any other residue.

Between the flue gas inlet 96 and the jets 84, in an appropriate location in the intermediate region 76, a scrubber 90 (not shown in detail) can optionally be provided to collect any solid particles from the flue gas. The scrubber can be of any known type, such as a packed bed, venturi scrubber, or a spray chamber or one or more water reservoirs.

Towards the first end 72 of the steam generator 70, and below the jets 84, steam outlet 86 is provided. At or close to the outlet 86, a demister 88 can be provided to prevent larger droplets of water passing through the outlet with the steam and into the steam product delivery pipe 100. Product delivery pipe 100 can be provided with a recirculated steam outlet 94, for selective diversion of part of the steam product back to the recirculated steam inlet 46 in the combustor 10. Optionally, product delivery pipe 100 can also be provided with a quality adjustment means 92, which can include an inlet for delivery of water to the steam, to increase its liquid content where required.

Figure 2:
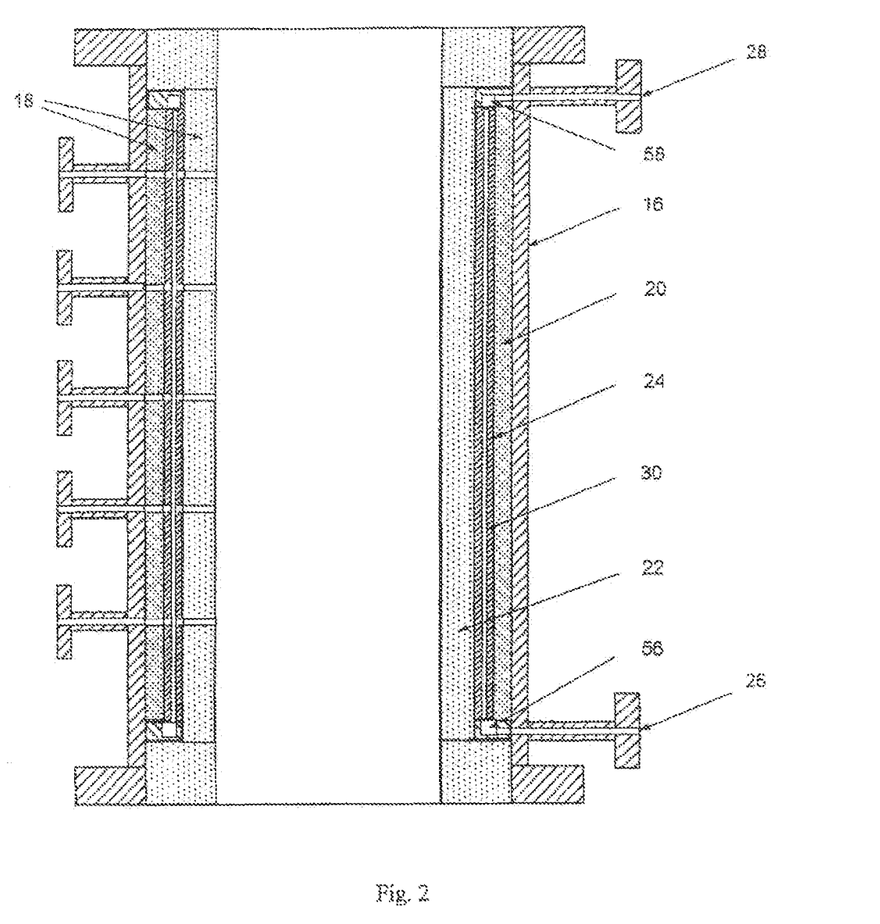
FIG. 2 is a schematic cross-sectional view of the combustor of an embodiment of the invention.
Figure 3:
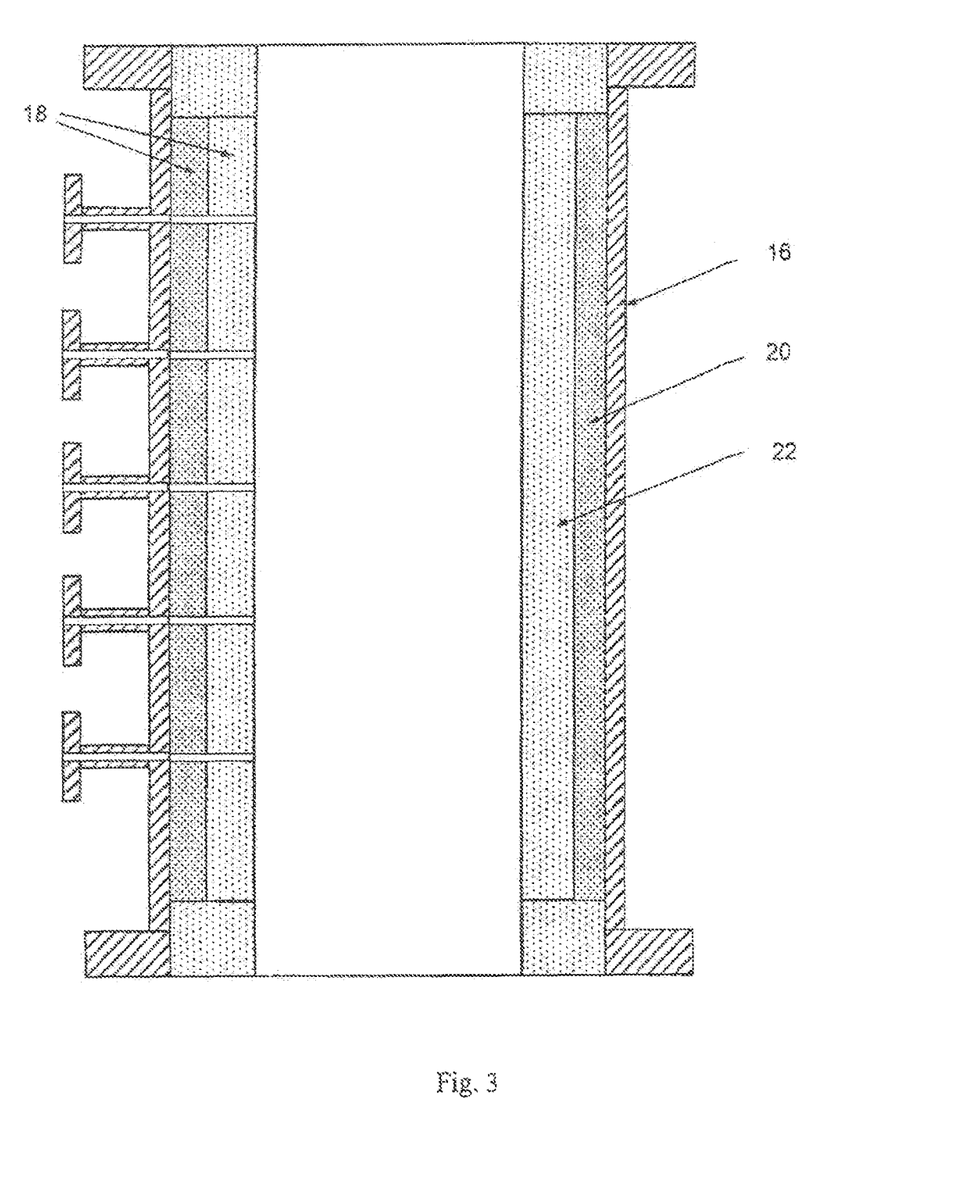
FIG. 3 is a schematic cross-sectional view of the combustor of a second embodiment of the invention.

Referring now to FIG. 2, the construction of combustor 10 is shown in more detail, in particular in relation to the cooling of the outer wall 16 of the combustor chamber 50. As noted above, the outer wall 16 is provided with a refractory liner 18, which can comprise a single material, or multiple materials. In FIG. 2 the liner is shown as comprising an outer portion 20 and an inner portion 22, by and between which are secured a plurality of cooling tubes 24, each having a central bore to provide a flow path 30 for a suitable coolant fluid, for example water, and each being operatively connected to an inlet 26 and outlet 28 via inlet header 56 and outlet header 58, respectively.

The method and operation of the apparatus of the invention are as follows.

Prior to raising the combustor 10 to a selected operating pressure from ambient atmospheric pressure, a pre-heating step is performed, by delivering a flow of pre-heat fuel through the pre-heat fuel inlet 42, to raise the temperature of the wall of the refractory liner 18, which assists in ignition. Suitable pre-heat fuels would include liquid or gaseous fuels, such as natural gas, or No. 2 fuel oil.

After the pre-heat step, either a supply of nitrogen is delivered above the desired combustor operating pressure into the combustor chamber 50 which raises the pressure, followed by a supply of fuel and oxygen at inlets 36 and 38 respectively, each at a pressure exceeding the combustor pressure; or the supply of fuel and oxygen is commenced while the combustor 10 is still at ambient pressure, and the pressure is raised by the burning of the fuel with oxygen while restricting the flow of the product stream 100. Concurrently with the flow of fuel and oxygen, small amounts of water can be added through water inlet 40 as needed to moderate the flame and regulate the temperature of the tip of the burner. Where nitrogen is used to raise the pressure, the amount required for the brief period is small, so that its effect on the end steam product is minimal and can generally be regarded as negligible.

As noted above, fuels for the combustion operation can be any of a wide range of liquid, gaseous or solid fuels. However, it is particularly advantageous for environmental and economic reasons to use the solid fuels which have few or less economically viable uses for other purposes, such as bitumen, asphaltene, coal, and petroleum coke. If these solid fuels are used, they are preferably delivered in the form of a slurry, which may also include an emulsifier.

The oxygen delivered to the oxygen inlet 38 can be supplied from commercial containers, or by pipeline, or in situations where feasible, can be prepared by a physically adjacent air separation unit.

The supply of fluid is introduced to the combustor chamber below the burner, through inlets 54. Any contaminants in the fluid, including hydrocarbons, are combusted with the fuel from inlet 36, to form a steady stream of flue gas, which is discharged from the combustor 10 through flue gas outlet 60, and a combustion residue which travels through the lower region of the combustor and to the second end 14.

The combustor can be operated at any desired pressure, within any operating range above atmospheric pressure up to at least 175 bar. The selection of the combustor pressure will be determined by factors depending on the field of use.

The flue gas discharged from flue gas outlet 60 is delivered to flue gas inlet 96 located in the lower part of the intermediate region 76 of the steam generator 70. As the flue gas rises in the steam generator, it comes into contact with the stream of water which is supplied through the fluid inlet 80 and delivered into the generator 70 through the nozzle 82 and jets 84. The heat of the flue gas vaporizes the water into steam, which passes demister 88, which removes any large water droplets, and is discharged through steam outlet 86, into steam product delivery pipe 100. Shortly after the steam passes into the product delivery pipe 100, it can be subjected to a quality adjustment by quality adjustment means 92, for example to add liquid water content where needed for the specific intended end use. For example, where the steam is to be used in a SAGD process, additional liquid water in the steam product on delivery into the shaft will facilitate flushing solids down the shaft.

Optionally, some of the steam product can be diverted from the flow in the product delivery pipe 100, to be recirculated through the recirculated steam outlet 94 back to the recirculated steam inlet 46 for use in the combustor 10.

As noted above, a scrubber 90 can be provided in the intermediate region 76 of the steam generator 70; as noted above, the scrubber 90 can be of any known type, such as a packed bed or venturi scrubber, or a spray chamber or a bubbling means such as one or more water reservoirs. In such embodiment, the flue gas passes through the scrubber 90, which removes residual particulate matter from the flue gas as it comes into contact with the water delivered to the steam generator 70 by the jets 84 and flows through the scrubber.

Optionally, a supply of a suitable sorbent material such as the alkali elements calcium, magnesium, sodium and potassium, in various forms (typically hydroxides or carbonates) can be added into the steam generation fluid before delivery into the fluid inlet 80, to assist in removing any acids in the flue gas stream.

Any residual water which may not be converted to steam by the flue gas will fall towards the second end 74 of the steam generator 70, together with any solid residues. Residual water collected in the second end 74 of the steam generator 70 may be recirculated through the recirculated residual water outlet 98 to the fluid inlet 80. The residual solids can be discharged periodically as required through the blowdown 78.

Similarly, the accumulation of residues such as ash on the walls of the combustor chamber 50 is addressed by periodic purging through the upper ash purge water inlet 48; and accumulations at the second end 14 of the combustor 10 can be addressed by delivery of additional fluid through the lower ash purge water inlet 52, either periodically or through a continuous discharge.

Optionally, a grinder (not shown) of known construction can be provided closely adjacent to the lower outlet 62, to reduce any accumulations of solids.

The invention claimed is:

1. A method of oxy-fired direct contact steam generation comprising the steps of
   (a) providing
     (i) a vertically arranged combustor constructed and arranged to be selectively operable at a pressure exceeding atmospheric pressure, and having a first combustor end and a second combustor end, and comprising:
       (1) a combustor wall comprising an outer wall and a refractory liner having an inner surface defining a combustion space;
       (2) a burner proximate the first combustor end;
       (3) at least a first fuel inlet proximate the first combustor end and constructed and arranged to deliver a first fuel to the burner at a delivery pressure exceeding atmospheric pressure;
       (4) at least one oxidant inlet proximate the first combustor end and constructed and arranged to deliver a supply of oxygen having a purity of 90% or more to the burner, at a delivery pressure exceeding atmospheric pressure;
       (5) a plurality of fluid inlets operatively connected to the combustion space and constructed and arranged to deliver a supply of a fluid including contaminated water with dissolved, suspended and entrained solids and hydrocarbons, at a delivery pressure exceeding atmospheric pressure;
       (6) an outlet region proximate the second combustor end and having a flue gas outlet located above and separate from a combustor residue outlet located at or near the bottom end of the second combustor end capable of managing a slag formed in the second combustor end from solids above the slagging temperature; and
       (7) at least one ash purge wash fluid inlet constructed and arranged to deliver wash fluid into the second combustor end to contact different surfaces within the combustor including an inner surface proximate the second combustor end; and
     (ii) a steam generator operatively connected to the combustor and having an upper region, a lower region, an intermediate region and a residue outlet;
   (b) performing a pre-heating process at ambient pressure to raise the temperature within the combustor wall to a selected temperature;
   (c) delivering a fuel and a supply of oxygen having a purity of at least 90% to the burner at a pressure exceeding a selected combustor operating pressure;
   (d) burning the fuel in the presence of the oxygen at the selected combustor operating pressure and substantially concurrently delivering to the combustion space a supply of a fluid including water at a pressure exceeding the selected combustor operating pressure to produce a stream of flue gas and a separate combustion residue;
   (e) selectively periodically or substantially continuously recovering and removing the combustion residue through the combustor residue outlet;
   (f) delivering the stream of flue gas to the lower region of the steam generator and substantially concurrently delivering to the upper region a supply of steam generation fluid including water at a pressure exceeding the selected combustor operating pressure;
   (g) allowing the flue gas to contact the steam generation fluid to produce a stream of generated steam and a solids residue;
   (h) removing the stream of generated steam from the steam generator; and
   (i) selectively periodically or substantially continuously recovering and removing the solids residue including the slag formed in the second combustor end through the residue outlet by delivering wash fluid by the at least one ash purge wash fluid inlet into the second combustor end to contact different surfaces within the combustor including an inner surface proximate the second combustor end.

2. The method according to claim 1, wherein the selected combustor operating pressure is at least 3 bar.

3. The method according to claim 2, further comprising after step (b) the step of (b.1) providing a supply of nitrogen to the combustor to attain the selected combustor operating pressure, and the burning in step (d) maintains the selected combustor operating pressure.

4. The method according to claim 2, wherein the burning in step (d) is performed to attain and maintain the selected combustor operating pressure.

5. The method according to claim 1, wherein the fuel in step (c) is selected from the group consisting of a liquid fuel, a gaseous fuel and a solid fuel and mixtures thereof.

6. The method according to claim 5, wherein the solid fuel is a slurry including at least one of bitumen, asphaltene, coal, and petroleum coke.

7. The method according to claim 6, wherein the solid fuel is a slurry and comprises an emulsifier.

8. The method according to claim 1, wherein step (c) further includes providing a supply of water to the burner at a pressure exceeding the selected combustor operating pressure.

9. The method according to claim 1, wherein in step (d) the fluid includes at least one hydrocarbon material.

10. The method according to claim 1, wherein the combustor operating pressure is selected from between 3 bar and 175 bar.

11. The method according to claim 1, wherein the supply of oxygen has a purity between 90% and 100%.

12. The method according to claim 11, wherein the supply of oxygen has a purity between 95% and 100%.

13. The method according to claim 1, wherein step (a)(ii) further comprises providing a cleaning zone in the intermediate region of the steam generator.

14. The method according to claim 13, wherein the cleaning zone comprises at least one of a packed bed, a venturi scrubber, a spray chamber and at least one water reservoir.

15. The method according to claim 1, wherein the steam generation fluid delivered in step (e) further comprises a sorbent comprising an alkali element selected from calcium, magnesium, sodium and potassium.

16. The method according to claim 15, wherein the alkali element is in a compound form selected from a hydroxide and a carbonate.

17. The method according to claim 1, further comprising after step (g) the step of
   (g.1) passing the generated steam through a demisting region.

18. The method according to claim 1, wherein in step (f) the steam generation fluid comprises water including contaminants.

19. The method according to claim 1, wherein step (h) further comprises at least one adjusting of quality of the stream of generated steam.

20. The method according to claim 19, wherein the at least one adjusting of quality comprises providing a supply of a secondary liquid including water to the steam output.

21. The method according to claim 1, wherein step (h) comprises separating the steam output into a primary output and a secondary output, and recirculating at least part of the secondary output to the combustor.

* * * * *